(12) United States Patent
Ran et al.

(10) Patent No.: US 11,113,692 B1
(45) Date of Patent: *Sep. 7, 2021

(54) SECURE VERIFICATION OF CLAIMS

(71) Applicant: INTUIT INC., Mountain View, CA (US)

(72) Inventors: Alexander S. Ran, Palo Alto, CA (US); Christopher Z. Lesner, Palo Alto, CA (US)

(73) Assignee: INTUIT, INC., Mountain View, CA (US)

( * ) Notice: Subject to any disclaimer, the term of this patent is extended or adjusted under 35 U.S.C. 154(b) by 171 days.

This patent is subject to a terminal disclaimer.

(21) Appl. No.: 16/458,395

(22) Filed: Jul. 1, 2019

Related U.S. Application Data (63) Continuation of application No. 14/171,640, filed on Feb. 3, 2014, now Pat. No. 10,380,592.

(51) Int. Cl.
    *G06Q 20/40* (2012.01)

(52) U.S. Cl.
    CPC ............... *G06Q 20/4016* (2013.01)

(58) Field of Classification Search
    CPC ............ G06Q 30/0629; G06Q 20/4016
    USPC ........................... 705/26.64, 26.35
    See application file for complete search history.

(56) References Cited

U.S. PATENT DOCUMENTS

| 8,646,072 | B1 | 2/2014 | Savant |
| 2002/0035513 | A1 | 3/2002 | Kanazawa |
| 2002/0069129 | A1 | 6/2002 | Akutsu et al. |
| 2003/0033242 | A1* | 2/2003 | Lynch ............ G06Q 40/00 705/38 |
| 2004/0010472 | A1 | 1/2004 | Hilby et al. |
| 2006/0069641 | A1* | 3/2006 | Merithew ......... G06Q 40/02 705/38 |
| 2006/0074986 | A1 | 4/2006 | Mallalieu et al. |
| 2009/0119268 | A1 | 5/2009 | Bandaru et al. |
| 2010/0280955 | A1 | 11/2010 | Ross et al. |
| 2011/0087985 | A1* | 4/2011 | Buchanan ........ G06F 3/04847 715/771 |
| 2012/0216253 | A1 | 8/2012 | Cahn |
| 2013/0041841 | A1* | 2/2013 | Lyons ............ G06Q 50/16 705/36 R |

(Continued)

*Primary Examiner* — Alexis M Casey
(74) *Attorney, Agent, or Firm* — Patterson & Sheridan, LLP (57) ABSTRACT

During a verification technique, claim information for a claim made by an entity (which includes an attribute characterizing an entity) is verified using verification information determined from at least an account of the entity. For example, an individual may pre-register with a provider of the verification technique and authorize the provider to access the account, such as a social network, a financial account, and/or an account associated with a financial application (e.g., an accounting application, an income-tax preparation application, etc.). Subsequently, when the individual makes or provides the claim information associated with the claim, verification information associated with the claim information is aggregated and used to verify that the claim is valid. By verifying the claim, the verification technique may make it easier for individuals to prove their reputable identity attributes without disclosing additional confidential information, thereby maintaining their privacy.

20 Claims, 5 Drawing Sheets

(56) References Cited

U.S. PATENT DOCUMENTS

2013/0282523 A1    10/2013   Pfeffer et al.
2014/0180959 A1     6/2014   Gillen et al.

\* cited by examiner

SECURE VERIFICATION OF CLAIMS

RELATED APPLICATIONS

The present patent is a continuation of, and hereby claims priority under 35 U.S.C § 120 to pending U.S. patent application Ser. No. 14/171,640, entitled "SECURE VERIFICATION OF CLAIMS," by the same inventors, filed on 3 Feb. 2014 (Client Ref. No.: 1407492US; P+S Ref. No.: INTU/0047US).

This application is related to U.S. Non-Provisional application Ser. No. 14/086,052, entitled "Secure Verification of Web site Claims," by Alexander S. Ran and Christopher Z. Lesner, filed on Nov. 21, 2013, the contents of which are herein incorporated by reference.

BACKGROUND

The present disclosure generally relates to computer-based techniques for verifying claims associated with a financial transaction. More specifically, the present disclosure relates to a computer-based technique for verifying claim information associated with a claim made by an entity based on verification information associated with the claim information, where the verification information is obtained from an account associated with the entity.

While online financial transactions are increasingly popular, reports of fraud and identity theft have made dealing with potential unknown counterparties (i.e., strangers) during online financial transactions a source of concern. For example, it is often difficult online for people to demonstrate or prove their reputable identity attributes (such as an individual's employment status, education, etc.) without also sharing additional confidential information they would prefer not to share. However, disclosure of such additional confidential information to a stranger can put an individual at risk of fraud and identify theft, and violates their privacy. Moreover, it is often difficult for people to validate claims that are made online.

In many situations, people decide it is not worth the risk and difficulty to gain mutual trust during online financial transactions. As a consequence, many business and personal opportunities are missed, which adversely affects commercial activity and constitutes a significant opportunity cost.

SUMMARY

The disclosed embodiments relate to a computer system that verifies a claim. During operation, the computer system receives claim information for the claim associated with a financial transaction, where the claim includes an attribute characterizing an entity. Then, the computer system determines verification information associated with the claim information based on at least an account of the entity. Next, the computer system verifies the claim based on the determined verification information.

Note that the entity may be an individual. In some embodiments, the claim information indicates the individual is associated with an organization having a physical address, and determining the verification information involves determining a physical address associated with the individual. Additionally, the claim may be verified if the physical address associated with the individual is consistent with the physical address associated with the organization. Alternatively, the claim information may indicate the individual is associated with an organization having a name, and determining the verification information may involve collecting the verification information from the account of the individual. This verification information may include: the name, a number of connections to other individuals associated with the organization, and/or a duration of the association between the individual and the organization.

Moreover, determining the verification information may involve: determining a number of sources supporting the claim; and calculating a confidence metric based on the determined number of sources, where the confidence metric increases as the number of sources increases. In this case, the claim may be verified if the confidence metric exceeds a threshold value.

Furthermore, the claim information may include contact information of the entity, and determining the verification information may involve: sending a message using the contact information; and receiving a response to the message. For example, the contact information may include an email address and/or a telephone number, and the message may include an email and/or a Short Message Service (SMS) message.

In some embodiments, after verifying the claim, the computer system provides a certificate that indicates the claim is valid. This certificate may include a digital certificate associated with a provider of the method, and the provider may be other than the entity. Moreover, the certificate may include a link to a source of the claim information.

Furthermore, the claim information may be verified while protecting privacy of additional information associated with the entity.

Additionally, the verification information may specify a duration during which the attribute characterized the entity.

Another embodiment provides a method that includes at least some of the operations performed by the computer system.

Another embodiment provides a computer-program product for use with the computer system. This computer-program product includes instructions for at least some of the operations performed by the computer system.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a computer system, a technique for verifying a claim, and a computer-program product (e.g., software) for use with the computer system are described. During this verification technique, claim information for a claim made by an entity (which includes an attribute characterizing an entity) is verified using verification information determined from at least an account of the entity. For example, an individual may pre-register with a provider of the verification technique and authorize the provider to access the account, such as a social network, a financial account, and/or an account associated with a financial application (e.g., an accounting application, an income-tax preparation application, etc.). Subsequently, when the individual makes or provides the claim information for the claim, verification information associated with the claim information is aggregated and used to verify that the claim is valid.

By verifying the claim, the verification technique may make it easier for individuals to prove their reputable identity attributes without disclosing additional confidential information, thereby maintaining their privacy. This verification technique may increase trust and promote interaction (including financial transactions) between individuals (and/or organizations) in environments where the individuals do not know each other, such as online. Consequently, the verification technique may increase commercial activity.

In the discussion that follows, a user may include: an individual or a person (for example, an existing customer, a new customer, a service provider, a vender, a contractor, etc.), an organization, a business and/or a government agency. Furthermore, a 'business' should be understood to include: for-profit corporations, non-profit corporations, organizations, groups of individuals, sole proprietorships, government agencies, partnerships, etc. Additionally, a financial transaction may involve a product or a service (such as medical care) that is paid for using a type of currency, an asset and/or by barter. The financial transaction may be conducted by an individual and/or a business.

Figure 1:
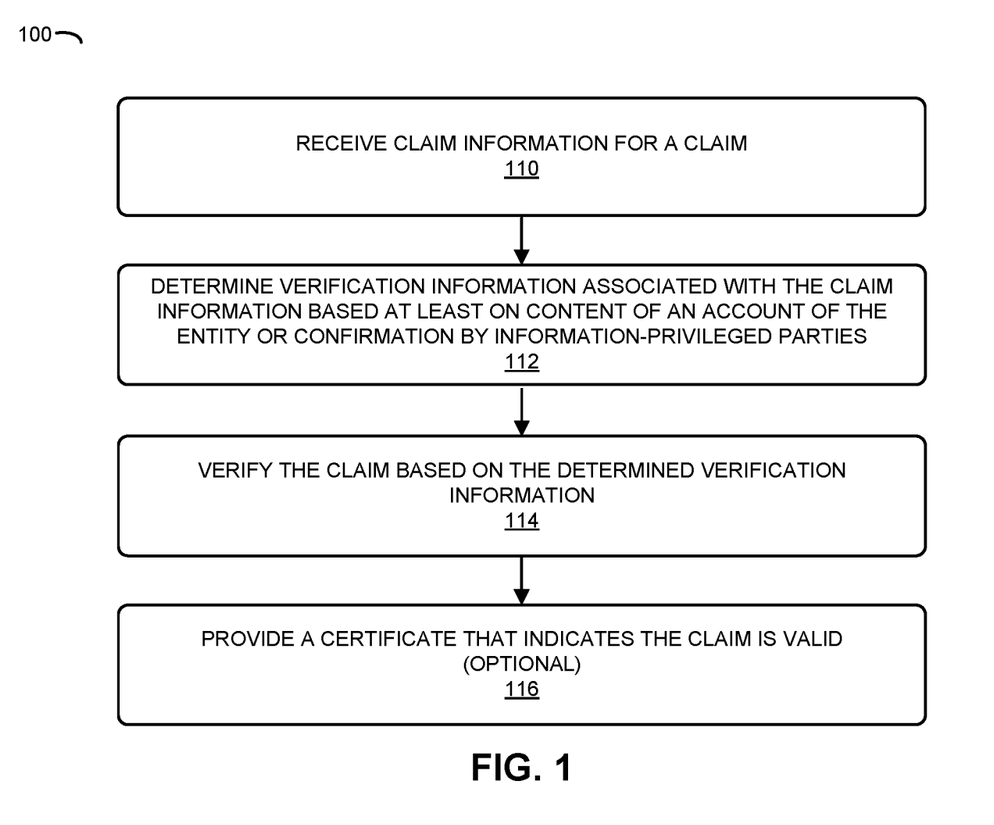
FIG. 1 is a flow chart illustrating a method for verifying a claim in accordance with an embodiment of the present disclosure.

We now describe embodiments of the verification technique. FIG. 1 presents a flow chart illustrating a method 100 for verifying a claim and allows them to be presented in a trust worthy way, which may be performed by a computer system (such as computer system 500 in FIG. 5). During operation, the computer system receives a request to verify a claim. In particular, the computer system may receive claim information for the claim (operation 110), where the claim includes an attribute characterizing an entity (which can include any attribute that can characterize the entity). For example, the entity may be an individual, and the claim may be: an identity of the individual, contact information for the individual (such as a telephone number, a mailing address, an email address, a link to a web page or website, etc.), an association with an organization or group of individuals (such as a claim of working at a company or an educational institution, being a member of a family, etc.), a college degree, status of a professional certification or license, a Social Security number, income/expenses, ownership of physical or virtual asserts (such as social-network accounts, domain names, real estate, etc.), performance of certain acts in the past (transactions, charitable donations, tests passed), etc. Note that the claim information may be received directly from the entity or indirectly (e.g., from another party that received the claim information from the entity). In some embodiments, the entity is a group of individuals.

Then, the computer system determines verification information associated with the claim information based on at least an account of the entity or information-privileged parties (operation 112). For example, the computer system may attempt to confirm the claim by aggregating verification information from one or more sources, such as the account associated with the entity. This account may include: an account on a social network, an account with a financial institution (such as a bank), etc. Alternatively or additionally, the verification information may include a duration during which the attribute characterized the entity, such as how long a telephone number has been associated with an individual. In some embodiments, the computer system may attempt to confirm the claim by sending a letter to a mailing address or calling a telephone number (which may be acknowledged by a recipient). More generally, the computer system may present options for how the claim can be verified, and may then verify the claim by determining the selected verification information.

Next, the computer system verifies the claim based on the determined verification information (operation 114). For example, the more sources that support the claim, the more likely the claim is to be valid. Thus, the verification information may be used by the computer system to determine a confidence metric for validity of the claim, and the confidence metric may be used to determine if the claim is valid. In particular, if the number of sources exceeds a threshold value (such as 1 or 3 sources), the individual's claim may be deemed valid or verified. However, in some embodiments, instead of a binary classification (valid or not), there may be multiple classifications (such as low confidence, medium confidence or high confidence), or an analog value may be provided by the computer system (such as a percentage between 0 and 100 that indicates the probability that the claim is valid).

In another example, if the individual claims they attend a school, the verification information may indicate that the individual's mailing or physical address matches or is consistent with that of the school, or that the individual has an email address that corresponds to the school. In these embodiments the claim may be verified by an information-privileged party, such as school officials or using a student-accounts registration system. Similarly, if the individual claims that they work at a company, their profile on a social network (such as a social network of professional or personal connections or contacts) may specify the company name and may include connections to multiple employees at the company. Furthermore, the profile may indicate a long duration that the attribute characterized the individual, such as the duration of the individual's claimed association with the company (e.g., five years, as opposed to three months). In addition, the financial-transaction history of the individual's account in an online income-tax preparation application or an accounting application may include multiple payroll deposits from the company. These types of verification information may increase the confidence in the individual's claim.

In another example, the claim information may include contact information of the entity, and determining the verification information may involve: sending a message using the contact information; and receiving a response to the message. In particular, the contact information may include an email address, a telephone number, and/or identity in an online marketplace or social network, and the message may include an email, an SMS message and/or a message provided by an online-marketplace or social-network message service. If the individual (or the entity) is in control or possession of the claimed identity, they will receive and respond to the message, thereby verifying that the claim information is valid.

In some embodiments, the claim is that the individual is who they say they are. This type of verification problem occurs frequently, such as during online interactions or transactions. For example, the individual may post an advertisement for a product that is for sale. A potential customer viewing the advertisement may not know for sure that the individual is who they claim to be, and may initially be reluctant to provide contact information or financial information (such as a credit-card number, a debit-card number, mobile-payment information, etc.) to the individual, or even to meet the individual. In turn, the individual may initially have similar concerns when they are contacted by the potential customer. The verification technique may be used by either or both parties in their interaction (i.e., the individual or the potential customer and, more generally, a counterparty or another individual) to authenticate each other. The verification technique can be used to verify either or both of these people's claims even though they do not know each other or anything about each other. In particular, a trusted third-party provider of the verification technique (i.e., other than the entity or the counterparty) may verify that either or both parties in their interaction are who they claim to be (using the computer system), and may provide either or both parties a token or something known that can be used to confirm that their claim(s) have been verified.

For example, the computer system may provide a token or a code to either or both parties in a message (which may be a push message that is communicated via email or an SMS). In particular, the potential customer and/or the individual may request verification, and in response may receive the token or the code (such as a hash of a telephone number). This token or code may be used when the individual and the counterparty meet to authenticate either or both parties (e.g., using a challenge/response). Thus, the individual may ask the counterparty (or vice versa) to confirm the token or code when they meet, thereby confirming that either or both parties are who they claim to be.

In some embodiments, after verifying the claim (operation 114), the computer system optionally provides a certificate that indicates the claim is valid (operation 116). (More generally, the computer system may optionally provide verification of the claim.) This certificate (which is sometimes referred to as a 'trust seal') may include a digital certificate associated with the provider of the verification technique or another party that provides claim verification based, for example, on privileged information. The individual may include the certificate in a web page or a website (such as an advertisement) to indicate that the third party provider of the verification technique has verified a claim on the web page or website. Moreover, the certificate may include a link to a source of the claim information, such as the web page or website. If a viewer of the web page or website activates the link (such as a hyperlink), it may point back to the web page or website. This may prevent the certificate from being stolen and misused. Alternatively, the certificate may be signed using a public encryption key of the entity and a private encryption key of the provider of the verification technique. Subsequently, a viewer's browser may confirm the authenticity of a digital signature in the certificate using standard verification techniques. Furthermore, the certificate may include a HyperText Markup Language (HTML) tag and/or other metadata. In some embodiments, the certificate may include a usage context associated with its display on a particular web page or website. For example, the usage context may include a period of validity, a domain name and/or uniform resource locator (URL) associated with the web page or website, and/or a position of the certificate in the web page or web site (e.g., top, bottom, side, adjacent to other elements in the web page or web site, etc.).

Additionally, the verification technique may be used in the context of other services or applications. For example, the individual may provide the claim information to a social network, and may authorize the provider of the social network to verify the claim information using the verification technique. Consequently, in response the provider of the social network may forward the claim information to the provider of the verification technique for verification. After the provider of the verification technique has verified the claim information, the provider of the social network may post the claim information on a web page or website or include it in the individual's profile.

Thus, in a variety of ways the verification technique may be used to authenticate the individual's claims. Moreover, all of this may occur without requiring that the entity provide additional, unnecessary information about themselves, which they may not want to publicly disclose. Therefore, the verification technique may verify the claim information while protecting privacy of additional information associated with the entity.

Figure 2:
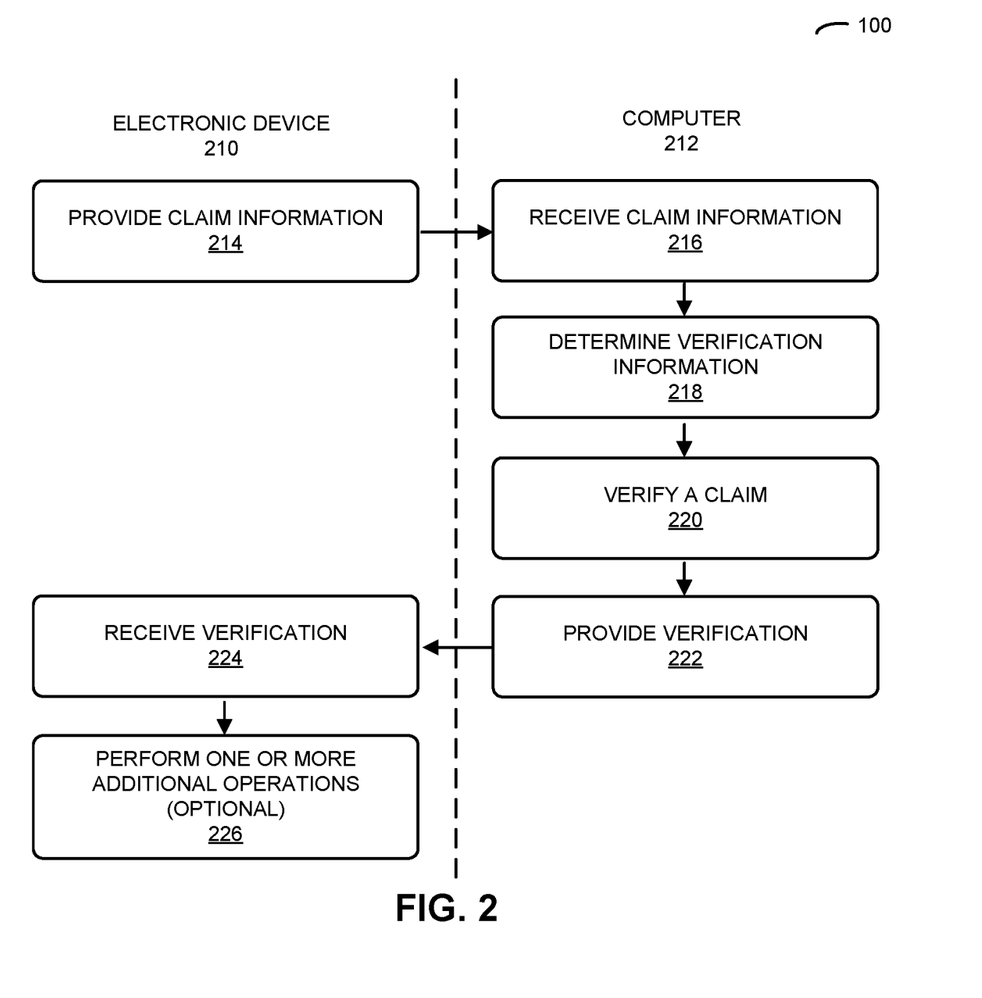
FIG. 2 is a flow chart illustrating the method of FIG. 1 in accordance with an embodiment of the present disclosure.

In an exemplary embodiment, the verification technique is implemented using one or more electronic devices (such as a computer or a portable electronic device, e.g., a cellular telephone) and one or more computers (such as a server or a computer system), which communicate through a network, such as a cellular-telephone network and/or the Internet. This is illustrated in FIG. 2, which presents a flow chart illustrating method 100 (FIG. 1).

During the method, a user of electronic device 210 (such as an individual) may provide (operation 214) and computer 212 may receive (operation 216) the claim information. In response, computer 212 may determine the verification information (operation 218) from one or more accounts of the user. For example, the claim information may indicate that the user works for a company, and computer 212 may access a financial-transaction history of the user to confirm that the user receives deposits or paychecks from the company. Alternatively, computer 212 may access the user's profile on a social network to confirm that the user has multiple contacts or connections with other employees of the company.

After verifying the claim (operation 220), computer 212 may provide (operation 222) and electronic device 210 may receive (operation 224) verification of the claim information. This verification may include a certificate (which may be digitally signed using a symmetric or an asymmetric encryption technique). The user may perform one or more additional operations (operation 226) using the certificate. For example, the user may embed this certificate in document (such as a web page or website) that includes the claim information for the claim.

In some embodiments of method 100 (FIGS. 1 and 2), there are additional or fewer operations. For example, in addition to or independently of providing the certificate, the computer system in method 100 (FIG. 1) may make the output of the claim verification process available for easy wide spread use. Thus, the computer system may present verification results in a secure and trustworthy manner. Moreover, the order of the operations may be changed, and/or two or more operations may be combined into a single operation.

In an exemplary embodiment, the verification technique is used to verify claim information for a claim while protecting the privacy of the entity (such as the individual) and the counterparty. In particular, credit-reporting agencies may collect information about an individual's bill-payment habits, and may use this information when the individual applies for credit or needs trust. However, credit reports do not protect the individual's privacy. Similarly, if an individual sees an online advertisement for an item or residence they want to rent or buy, they may be reluctant to reply to the advertisement with their Social Security number and give strangers permission to access their credit history.

Alternatively, many websites (such as online marketplaces and social networks) allow users to create disposable or pseudonymous identities. This allows the users to maintain their privacy while allowing them to build a reputation based on their history of interactions with other users. However, new users, who do not have histories, may be at a significant disadvantage.

In addition, it is often difficult for users to use their existing real-world reputations in these online environments. For example, the privacy settings in many social networks and online marketplaces protect parts of their users' profiles, but this may make it difficult for the users to leverage their real-world reputations without compromising their privacy. In particular, in order to use their real-world reputations, users may need to reveal: their names, their user identifiers, where they work, where they went to school, etc. If a user provides such information, thereby obtaining a better offer by establishing their good reputation, there is no way for the user to keep the disclosed information from being used by a counterparty in unintended ways. Thus, the counterparty may use the disclosed information to make a friend request on a social network or may be able to read the user's postings in an online forum. The verification technique may allow individuals or organizations (and, more generally, entities) to verify the authenticity, integrity and ownership of their reputations while protecting their privacy.

In particular, the verification technique may allow an entity (such as an individual) to securely import and present facts about themselves in a way that protects their privacy, while allowing anyone to check the authenticity, integrity and ownership of what they have presented, thereby preventing fraud and impersonation attempts. During a one-time setup process, users may allow the computer system operated by or on behalf of the provider of the verification technique to access sources of information about themselves. Then, whenever one of the users wants to establish trust, they can present a privacy-protected, secure view of verified information supported by the sources they have connected. For example, the computer system may: aggregate, refine, and verify facts about an identity; present privacy-protecting views of verified and implied facts; and verify view authenticity, integrity and ownership.

In an exemplary embodiment, a potential customer views an online advertisement from an individual for an old computer. However, this individual may be reluctant to give out their address to the potential customer, let alone let them into their home. The verification technique may be used to allow these strangers to gain each other's trust using verified information while protecting their privacy.

In particular, during the one-time setup process, the individual may specify sources of information about themselves, and may allow or authorize the computer system to access these sources. From these sources, facts about the individual may be extracted and cross-checked. New facts about the individual may also be derived. For example, if the computer system confirms an email address at a company and a financial-transaction history in an income-tax preparation application indicates that there were regular deposits from the company, the computer system may determine that the individual works at the company.

Note that a wide variety of sources of information may be used, including: accounts with one or more social networks, accounts with one or more online marketplaces, accounts with one or more university registrars (which may include course information, grades and degrees), and/or accounts with one or more software programs or applications (such as an accounting application, an income-tax preparation application, a payroll application, etc.). Moreover, the individual may authorize access to one or more of their accounts in a variety of ways, including: providing account credentials and allowing the provider of the verification technique to log in and scrape the verification information; providing access to one or more accounts; and/or confirming source ownership via a hard-to-forge signal (such as by posting a special message).

When trust is needed, a certificate (which is sometimes referred to as a 'view') may be generated and provided by the computer system. This view may include facts that promote trust, but at a level of detail suitable for the situation so that privacy is protected. For example, the view may be generated when: a seller/buyer screen each other before meeting, an employer/employee screen each other before an interview, a landlord/tenant screen each other before a meeting, potential partners screen each other before a date, etc. In the case of the individual selling the old computer, the view presented to the potential customer may indicate that: the computer was purchased four years ago; the individual has conducted more than 80 financial transactions in the last two years in an online marketplace with more than a 95% positive rating; the individual has had the telephone number 905-561-44XX for more than five years; and the individual has lived in Mountain View, Calif. for more than ten years.

Based on the presented verified-claims view, the potential customer or buyer may learn that the advertisement is genuine, as opposed to being the work of a spammer harvesting contact information or a marketer testing a concept or deceptively advertising things like penny auctions. The potential customer also knows that the item being sold has not been stolen and that it is not a 'lemon' that has previously been resold many times. However, the view does not leak any other confidential or proprietary information about the individual.

Before the individual invites the potential customer into their home, the individual may ask them about themselves. If the potential customer cares about their privacy, they may use the verification technique to generate a view for the individual. This view may prove that the potential customer: has used their email address for more than ten years; has more than 30 online marketplace financial transactions in the last two years with more than a 95% positive rating; has lived at the same address in Palo Alto, Calif. for more than ten years; has been employed by the same Fortune 500 company for more than ten years; and/or has a university degree. Once again, this view does not leak any other confidential or proprietary information about the potential customer.

Note that the views may be digitally signed documents that include a reference to the context for which they were issued. In the case of the advertisement for the old computer, the view for the individual may include a URL that points back to the individual's computer advertisement. Moreover, the view for the potential customer may include an icon that, when activated, sends the individual a message with a token or code that the potential customer can confirm when they communicate or meet with the individual, thereby allowing the potential customer to confirm that they are interacting with the individual. More generally, the views may include a mechanism to trigger communication of a message that can be confirmed later to authenticate the individual and/or the potential customer.

As noted previously, the computer system operated by or on behalf of the provider of the verification technique may provide a certificate (such as a trust seal) that can be embedded in the web page or website (and, more generally, in a document) with the advertisement for the old computer. In this way, when the view of this certificate is presented to the potential customer (e.g., by a browser), they can confirm that they are dealing with the owner of that view, as opposed to a fraudster claiming ownership (e.g., a replay attack). For example, the browser can check the digital signature of the certificate. Alternatively or additionally, using techniques such as OAuth, U-prove (from Microsoft Corp., of Redmond, Wash.) and/or similar secure authentication protocols, the individual may authorize the potential customer to access specific subsets of the certificate (i.e., different views) upon request. For example they may attach suitable views to their profiles on social networks and marketplaces.

By using the verification technique, both the individual (the seller in the preceding example) and the potential customer (the buyer) can determine that they are each reputable. Thus, the verification technique can be used to build trust by proving important facts about people and items, while simultaneously protecting privacy because identifying information is not disclosed.

The verification technique may allow verification of identity facts related to online services, such as social and business networks, marketplaces, personal finance, small-business management, federal and state income taxes, educational institutions, etc. Moreover, the verification technique may allow users to create privacy-protecting views of their information (with minimal disclosure of additional confidential information) and to share this information with specific organizations or individuals. Thus, an individual can prove they are of legal drinking age without showing their driver's license (which also reveals their birthday and mailing address). Similarly, the individual may prove that they have specific expertise using a profile in a social network without revealing their name, where they work, who their work colleagues are, etc.

Figure 3:
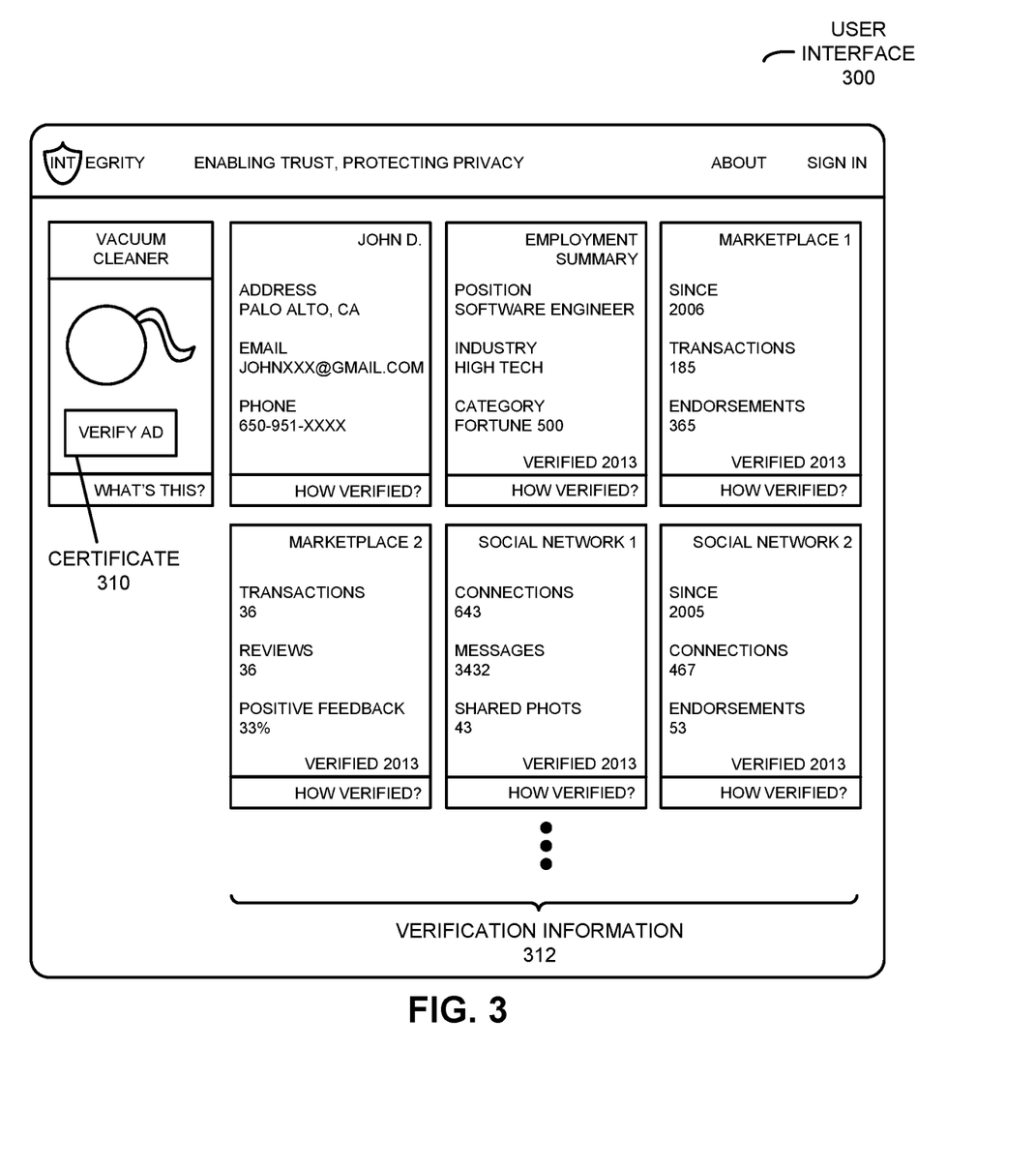
FIG. 3 is a drawing of a user interface that verifies claims in accordance with an embodiment of the present disclosure.

FIG. 3 presents a drawing of a user interface 300 that verifies claims (in this case, that an individual, John D., is selling a vacuum cleaner). If a potential customer activates an embedded certificate 310 (verify ad'), windows with verification information 312 are presented as a 'view' to the potential customer. This verification information can be taken from multiple accounts or sources, including: the individual's employer, multiple online marketplaces, and multiple social networks. Note that verification information 312, as well as the verification provided by the provider of the verification technique, help establish trust between the individual and the potential customer, thereby facilitating a financial transaction (in this case, sale of the vacuum cleaner).

Figure 4:
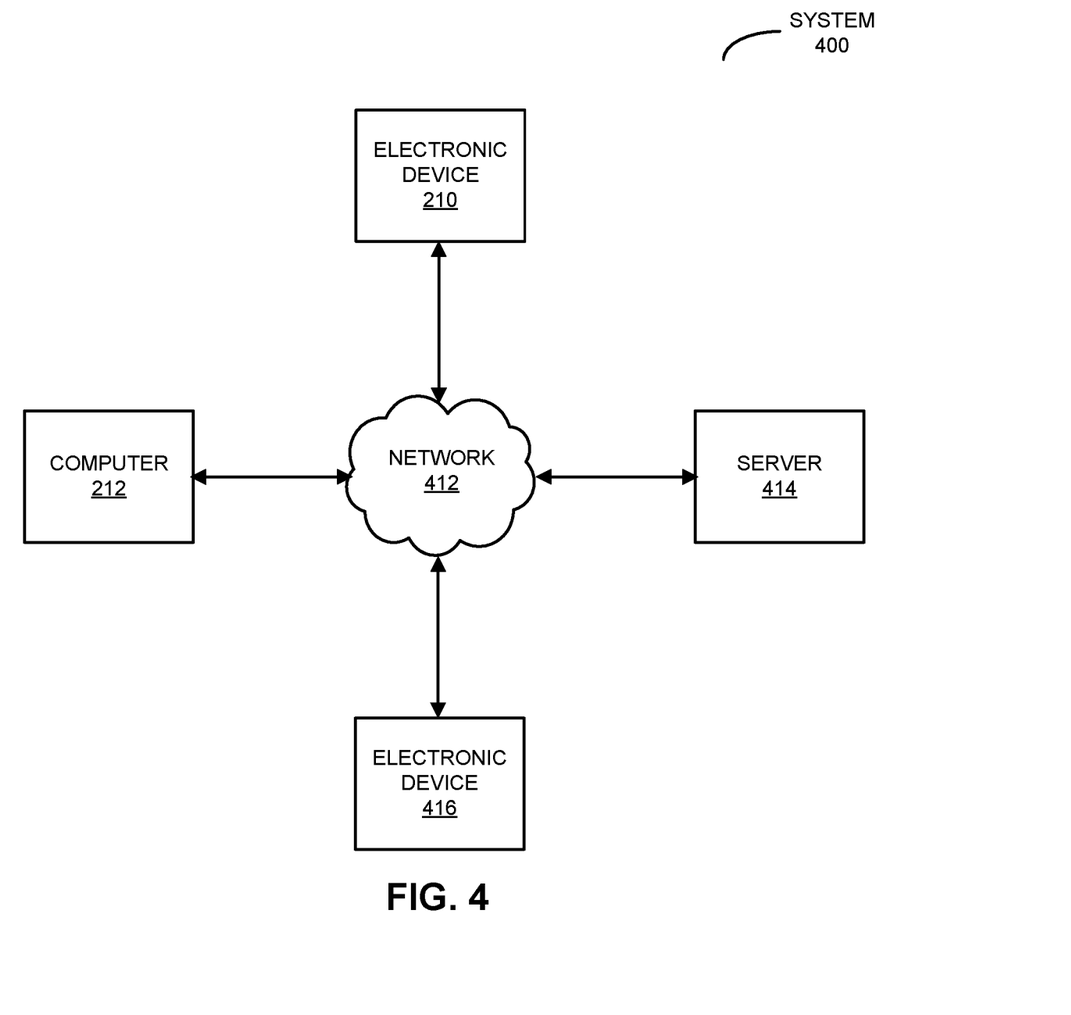
FIG. 4 is a block diagram illustrating a system that performs the method of FIGS. 1 and 2 in accordance with an embodiment of the present disclosure.

We now describe embodiments of a system and the computer system, and their use. FIG. 4 presents a block diagram illustrating a system 400 that can be used, in part, to perform operations in method 100 (FIGS. 1 and 2). In this system, during the verification technique electronic device 210 may use a software product, such as an application that is resident on and that executes on electronic device 210. (Alternatively, the user may interact with a web page that is provided by computer 212 via network 412, and which is rendered by a web browser on electronic device 210. For example, at least a portion of the application may be an application tool that is embedded in the web page, and which executes in a virtual environment of the web browser. Thus, the application tool may be provided to electronic device 210 via a client-server architecture.) This application may be a standalone application or a portion of another application that is resident on and which executes on electronic device 210 (such as an application that is provided by computer 212 or that is installed and which executes on electronic device 210). In an exemplary embodiment, the software product may be a financial application, such as an accounting application, an income-tax application or a payroll application.

During the verification technique, the user of electronic device 210 may use the financial application. When using the financial application, the user may provide the claim information to server 414 via network 412. For example, the user may type in the claim information for a claim. Alternatively, a voice-recognition technique may be used to analyze the user's spoken words to obtain the claim information. Note that server 414 may host a web page or web site for the user.

Then, server 414 may provide the claim information to computer 212 via network 412. In response, computer 212 may determine the verification information from one or more accounts of the user. For example, computer 212 may access a financial-transaction history of the user that is associated with the financial application, and may access the user's profile on a social network. Note that the accessing may involve accessing additional electronic devices, computers and/or servers (not shown) via network 412. Then, computer 212 may verify the claim based on the determined verification information.

After verifying the claim, computer 212 may provide verification of the claim information to server 414 via network 412. This verification may include a certificate (which may be digitally signed). In response, server 414 may post the claim information on the web page or website. In addition, server 414 may embed the certificate in the web page or website.

Subsequently, another user (such as a potential customer) of electronic device 416 may view the web page or website. For example, in response to the other user accessing a URL of the web page or website, server 414 may provide display information to electronic device 416 via network 412. This display information may be presented to the other user by a browser on electronic device 416 as the web page or website. If the user activates the displayed certificate that is embedded in the web page or website, a view may be presented to the other user that confirms the authenticity of the claims in the web page or web site, and/or the authenticity of the user of electronic device 210. In this way, the verification technique can be used to facilitate trust between the user and the other user, and thus can facilitate interaction (such as a financial transaction) between the user and the other user.

Note that information in system 400 may be stored at one or more locations in system 400 (i.e., locally or remotely). Moreover, because this data may be sensitive in nature, it may be encrypted. For example, stored data and/or data communicated via network 412 may be encrypted.

Figure 5:
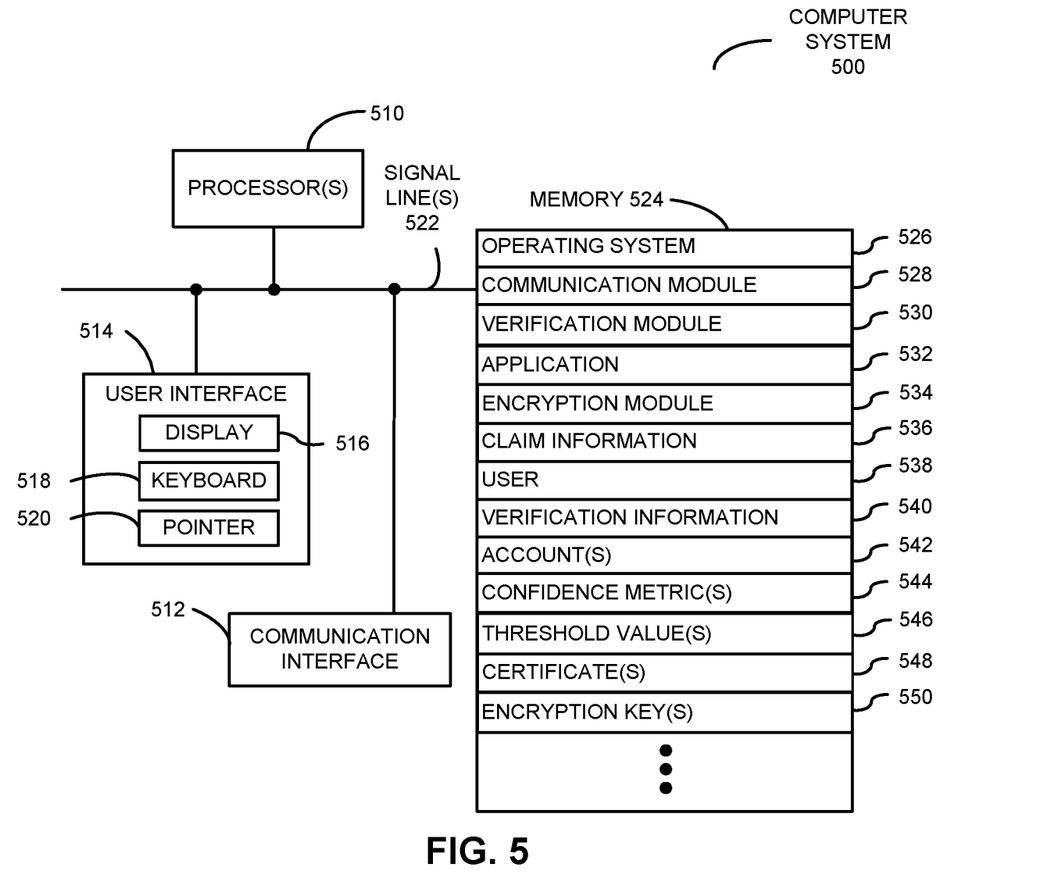
FIG. 5 is a block diagram illustrating a computer system that performs the method of FIGS. 1 and 2 in accordance with an embodiment of the present disclosure.

FIG. 5 presents a block diagram illustrating a computer system 500 that performs methods 100 (FIGS. 1 and 2). Computer system 500 includes one or more processing units or processors 510, a communication interface 512, a user interface 514, and one or more signal lines 522 coupling these components together. Note that the one or more processors 510 may support parallel processing and/or multi-threaded operation, the communication interface 512 may have a persistent communication connection, and the one or more signal lines 522 may constitute a communication bus. Moreover, the user interface 514 may include: a display 516, a keyboard 518, and/or a pointer 520, such as a mouse.

Memory 524 in computer system 500 may include volatile memory and/or non-volatile memory. More specifically, memory 524 may include: ROM, RAM, EPROM, EEPROM, flash memory, one or more smart cards, one or more magnetic disc storage devices, and/or one or more optical storage devices. Memory 524 may store an operating system 526 that includes procedures (or a set of instructions) for handling various basic system services for performing hardware-dependent tasks. Memory 524 may also store procedures (or a set of instructions) in a communication module 528. These communication procedures may be used for communicating with one or more computers and/or servers, including computers and/or servers that are remotely located with respect to computer system 500.

Memory 524 may also include multiple program modules (or sets of instructions), including: verification module 530 (or a set of instructions), application 532 (or a set of instructions), and/or encryption module 534 (or a set of instructions). Note that one or more of these program modules (or sets of instructions) may constitute a computer-program mechanism.

During the verification technique, verification module 530 may receive, via communication interface 512 and communication module 528, claim information 536. For example, user 538 may interact with a user interface to provide claim information 536.

In response to receiving claim information 536, verification module 530 may determine verification information 540 from one or more accounts 542 of user 538. For example, the one or more accounts 542 may be associated with application 532, such as a financial application or a social-network application.

Then, verification module 530 may verify the claim specified by claim information 536. For example, verification module 530 may calculate one or more confidence metrics 544 based on verification information 540, and may compare the one or more confidence metrics 544 to one or more threshold values 546. If a given confidence metric exceeds a threshold value, verification module 530 may determine that the associated claim is valid.

After verifying the claim, verification module 530 may provide verification to user 538 or another party (such as a server that hosts a web page or website of user 538) via communication module 528 and communication interface 512. This verification may include one or more certificates 548. Note that the one or more certificates 548 may be digitally signed by encryption module 534 using one or more encryption keys 550 (such as a public encryption key of user 538 and/or a private encryption key of a provider of the verification technique).

Instructions in the various modules in memory 524 may be implemented in: a high-level procedural language, an object-oriented programming language, and/or in an assembly or machine language. Note that the programming language may be compiled or interpreted, e.g., configurable or configured, to be executed by the one or more processors 510.

Although computer system 500 is illustrated as having a number of discrete items, FIG. 5 is intended to be a functional description of the various features that may be present in computer system 500 rather than a structural schematic of the embodiments described herein. In some embodiments, some or all of the functionality of computer system 500 may be implemented in one or more application-specific integrated circuits (ASICs) and/or one or more digital signal processors (DSPs).

Computer system 500, as well as electronic devices, computers and servers in system 500, may include one of a variety of devices capable of manipulating computer-readable data or communicating such data between two or more computing systems over a network, including: a personal computer, a laptop computer, a tablet computer, a mainframe computer, a portable electronic device (such as a cellular telephone or PDA), a server, a point-of-sale terminal and/or a client computer (in a client-server architecture). Moreover, network 412 (FIG. 4) may include: the Internet, World Wide Web (WWW), an intranet, a cellular-telephone network, LAN, WAN, MAN, or a combination of networks, or other technology enabling communication between computing systems.

Electronic device 210 (FIGS. 2 and 4), computer 212 (FIGS. 2 and 4), system 400 (FIG. 4), and/or computer system 500 may include fewer components or additional components. Moreover, two or more components may be combined into a single component, and/or a position of one or more components may be changed. In some embodiments, the functionality of electronic device 210 (FIGS. 2 and 4), computer 212 (FIGS. 2 and 4), system 400 (FIG. 4), and/or computer system 500 may be implemented more in hardware and less in software, or less in hardware and more in software, as is known in the art.

While the verification technique was illustrated in the context of certain types of applications (such as an income-tax preparation application), the verification technique may be used with a wide variety of applications, such as: browsers, social-networking applications, e-mail programs, search-engine interfaces, source-code editors, database-query tools, word processors, command-line interpreters and/or text editors.

Furthermore, while server 414 (FIG. 4) was illustrated as hosting the web page or website, in other embodiments computer 212 (FIGS. 2 and 4) may host the web page or website. Additionally, while the claim was illustrated as being associated with a financial transaction, in other embodiments the claim may be more general, and may also include attributes or characteristics associated with individuals, objects or events that are unrelated to financial transactions.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-implemented method for verifying a claim associated with an online transaction, comprising:
   receiving, by operation of a processor, claim information for the claim, wherein the claim information includes an attribute characterizing a seller related to an online advertisement;
   determining, by the processor, verification information associated with the claim information by accessing a plurality of accounts over a network, each account of the plurality of accounts providing an source of information characterizing the seller, wherein at least one of the plurality of accounts is associated with an application, and wherein the accessing is authorized in advance by the seller;
   verifying, by the processor, the claim by confirming the claim information against the verification information;
   once the claim is verified, generating, by the processor, a plurality of views of the verification information for presentation on a user interface, each view including a subset of the verification information, wherein the plurality of views includes at least a first view and a second view, wherein the subset included in the first view differs from the subset included in the second view, wherein each of the first view and the second view comprises a digitally-signed certificate
   receiving, by the processor, a request from a computing device associated with a potential customer to access the verification information;
   receiving, by the processor, authorization from the seller for the potential customer to access the second view but not to access the first view;
   allowing, by the processor, based on the authorization, access by the potential customer to the second view; and
   providing, by the processor, the second view to the computing device for display to the potential customer.

2. The method of claim 1, wherein the seller is an individual.

3. The method of claim 1, wherein determining the verification information comprises:
   determining a number of sources supporting the claim; and
   calculating a confidence metric based on the number of sources, wherein the confidence metric increases as the number of sources increases and wherein the claim is verified if the confidence metric exceeds a threshold value.

4. The method of claim 1, wherein the claim information includes contact information of the seller and wherein determining the verification information comprises:
   sending a message using the contact information; and
   receiving a response to the message.

5. The method of claim 4, wherein the contact information includes at least one of an email address and a telephone number and wherein the message includes at least one of an email and a Short Message Service (SMS) message.

6. The method of claim 1, wherein the seller is an individual, wherein the claim information indicates the individual is associated with an organization having a physical address, wherein determining the verification information comprises determining a physical address associated with the individual, and wherein the claim is verified if the physical address associated with the individual is consistent with the physical address associated with the organization.

7. The method of claim 1, wherein the seller is an individual, wherein the claim information indicates the individual is associated with an organization having a name, wherein determining the verification information comprises collecting the verification information from an account of the individual, and wherein the verification information includes at least one of the name, a number of connections to other individuals associated with the organization, and a duration of association between the individual and the organization.

8. The method of claim 1, wherein each of the first view and the second view indicates the claim is valid.

9. The method of claim 1, wherein the digitally-signed certificate of each of the first view and the second view is associated with a provider of the method, and wherein the provider is other than the seller.

10. The method of claim 1, wherein the digitally-signed certificate of each of the first view and the second view includes a link to a source of the claim information.

11. The method of claim 1, wherein the claim information is verified while protecting privacy of additional information associated with the seller.

12. The method of claim 1, wherein the verification information specifies a duration during which the attribute characterized the seller.

13. A non-transitory computer-readable medium comprising instructions that, when executed by a processor, cause the processor to perform a method for verifying a claim associated with an online transaction, the method comprising:
   receiving claim information for the claim, wherein the claim information includes an attribute characterizing a seller related to an online advertisement;
   determining verification information associated with the claim information by accessing a plurality of accounts over a network, each account of the plurality of accounts providing an source of information characterizing the seller, wherein at least one of the plurality of accounts is associated with an application, and wherein the accessing is authorized in advance by the seller;
   verifying the claim by confirming the claim information against the verification information;
   once the claim is verified, generating a plurality of views of the verification information for presentation on a user interface, each view including a subset of the verification information, wherein the plurality of views includes at least a first view and a second view, wherein the subset included in the first view differs from the subset included in the second view, wherein each of the first view and the second view comprises a digitally-signed certificate
   receiving a request from a computing device associated with a potential customer to access the verification information;
   receiving authorization from the seller for the potential customer to access the second view but not to access the first view;
   allowing based on the authorization, access by the potential customer to the second view; and
   providing the second view to the computing device for display to the potential customer.

14. The non-transitory computer-readable medium of claim 13, wherein determining the verification information comprises:
   determining a number of sources supporting the claim; and
   calculating a confidence metric based on the number of sources, wherein the confidence metric increases as the number of sources increases and wherein the claim is verified if the confidence metric exceeds a threshold value.

15. The non-transitory computer-readable medium of claim 13, wherein the claim information includes contact information of the seller and wherein determining the verification information comprises:
sending a message using the contact information; and
receiving a response to the message.

16. The non-transitory computer-readable medium of claim 13, wherein each of the first view and the second view indicates the claim is valid.

17. The non-transitory computer-readable medium of claim 13, wherein the digitally-signed certificate of each of the first view and the second view includes a link to a source of the claim information.

18. A computer system, comprising:
a processor; and
a non-transitory computer-readable medium comprising instructions that, when executed by the processor, cause the processor to perform a method for verifying a claim associated with an online transaction, the method comprising:
receiving claim information for the claim, wherein the claim information includes an attribute characterizing a seller related to an online advertisement;
determining verification information associated with the claim information by accessing a plurality of accounts over a network, each account of the plurality of accounts providing an source of information characterizing the seller, wherein at least one of the plurality of accounts is associated with an application, and wherein the accessing is authorized in advance by the seller;
verifying the claim by confirming the claim information against the verification information;
once the claim is verified, generating a plurality of views of the verification information for presentation on a user interface, each view including a subset of the verification information, wherein the plurality of views includes at least a first view and a second view, wherein the subset included in the first view differs from the subset included in the second view, wherein each of the first view and the second view comprises a digitally-signed certificate
receiving a request from a computing device associated with a potential customer to access the verification information;
receiving authorization from the seller for the potential customer to access the second view but not to access the first view;
allowing based on the authorization, access by the potential customer to the second view; and
providing the second view to the computing device for display to the potential customer.

19. The computer system of claim 18, wherein the claim information includes contact information of the seller and wherein determining the verification information comprises:
sending a message using the contact information; and
receiving a response to the message.

20. The computer system of claim 18, wherein each of the first view and the second view indicates the claim is valid.

* * * * *